United States Patent [19]

Hoskin

[11] Patent Number: 5,028,344
[45] Date of Patent: * Jul. 2, 1991

[54] STABILIZING AGENT FOR PROFILE CONTROL GELS AND POLYMERIC GELS OF IMPROVED STABILITY

[75] Inventor: Dennis H. Hoskin, Lawrenceville, N.J.

[73] Assignee: Mobile Oil Corporation, Fairfax, Va.

[*] Notice: The portion of the term of this patent subsequent to Apr. 10, 2007 has been disclaimed.

[21] Appl. No.: 497,367

[22] Filed: Mar. 22, 1990

Related U.S. Application Data

[62] Division of Ser. No. 311,303, Feb. 16, 1989, Pat. No. 4,928,766.

[51] Int. Cl.$^5$ .............................................. E21B 43/22
[52] U.S. Cl. ............................. 252/8.554; 252/8.551; 523/130; 166/270; 166/285; 166/295
[58] Field of Search .......................... 252/8.551, 8.554; 523/130; 166/295, 270, 285

[56] References Cited

U.S. PATENT DOCUMENTS

| | | | |
|---|---|---|---|
| 3,134,436 | 5/1964 | Means et al. | 166/295 |
| 3,305,016 | 2/1967 | Lindblom et al. | |
| 3,383,307 | 5/1968 | Goetz | |
| 3,573,263 | 3/1971 | Gill | |
| 3,908,760 | 9/1975 | Clampitt et al. | 166/246 |
| 3,918,521 | 11/1983 | Sandiford et al. | 166/272 |
| 4,009,755 | 3/1977 | Sandiford | 166/270 |
| 4,042,529 | 8/1977 | Nimerick et al. | 252/363.5 |
| 4,069,869 | 1/1978 | Sandiford | 166/270 |
| 4,342,866 | 8/1982 | Kang et al. | 252/8.554 X |
| 4,413,680 | 11/1983 | Sandiford et al. | 166/270 |
| 4,440,228 | 4/1984 | Swanson | 166/274 |
| 4,479,894 | 10/1984 | Chen et al. | 252/8.554 |
| 4,481,316 | 11/1984 | Kanda et al. | |
| 4,489,783 | 12/1984 | Shu | 166/272 |
| 4,565,249 | 1/1986 | Pebdani et al. | 166/303 |
| 4,613,631 | 9/1986 | Espenscheid et al. | 166/270 X |
| 4,658,898 | 4/1987 | Paul et al. | 166/270 |
| 4,663,310 | 9/1987 | Gibbons | 166/270 |
| 4,708,974 | 11/1987 | Chang et al. | 166/281 |
| 4,782,900 | 11/1988 | Fung et al. | 166/270 |
| 4,782,901 | 11/1988 | Phelps et al. | 166/270 |
| 4,785,028 | 11/1988 | Hoskin et al. | 166/295 |
| 4,787,451 | 11/1988 | Mitchell | 166/270 |
| 4,793,416 | 12/1988 | Mitchell | 166/266 |
| 4,810,732 | 3/1989 | Shu | 523/130 |
| 4,821,802 | 4/1989 | Meltz et al. | 166/270 |
| 4,896,724 | 1/1990 | Hazlett et al. | 166/285 |
| 4,899,818 | 2/1990 | Jennings, Jr. et al. | 166/270 |
| 4,901,795 | 2/1990 | Phelps | 166/270 |
| 4,915,170 | 4/1990 | Hoskin | 166/252 |
| 4,917,185 | 4/1990 | Jennings, Jr. et al. | 166/281 |
| 4,926,943 | 5/1990 | Hoskin | 166/270 |
| 4,934,456 | 6/1990 | Moradi-Araghi | 166/270 |

Primary Examiner—Robert L. Stoll
Assistant Examiner—Chhaya Sayala
Attorney, Agent, or Firm—A. J. McKillop; C. J. Speciale; M. J. Mlotkowski

[57] ABSTRACT

An aqueous polymeric gel-forming composition of improved stability for selectively plugging highly permeable zones in subterranean oil-bearing formations. The composition comprises an aqueous solution of a water-dispersible polymer present in a viscosifying amount, a crosslinking agent present in an amount sufficient to cause gelation and a stabilizing agent in an amount effective to reduce syneresis of the gelled composition.

11 Claims, No Drawings

STABILIZING AGENT FOR PROFILE CONTROL GELS AND POLYMERIC GELS OF IMPROVED STABILITY

This is a division of copending application Ser. No. 311,303, filed on Feb. 16, 1989, now U.S. Pat. No. 4,298,766.

FIELD OF THE INVENTION

This invention relates to a novel crosslinked gel-forming composition of improved stability which is useful in the control of permeability in subterranean oil-bearing formations during enhanced oil recovery operations and, more particularly, to the use of an additive to form a gel of improved stability. Use of such gel can yield improved sweep efficiency during fluid flooding operations.

BACKGROUND OF THE INVENTION

In the production of oil from subterranean formations, it is usually possible to recover only a small fraction of the total oil present in the formation by so-called primary recovery methods which utilize only the natural forces present in the reservoir. To recover oil beyond that which is produced by primary methods, a variety of supplemental production techniques have been employed. In these supplemental techniques, commonly referred to as secondary recovery operations, a fluid is introduced into the oil-bearing formation in order to displace oil to a production system comprising one or more production wells. The displacing or "drive" fluid may be an aqueous liquid such as brine or fresh water, a gas such as carbon dioxide, steam or dense-phase carbon dioxide, an oil-miscible liquid such as butane, or an oil and water-miscible liquid such as an alcohol. Often, the most cost-effective and desirable secondary recovery methods involve the injection of an aqueous or carbon dioxide flooding medium into an oil-bearing formation, either alone or in combination with other fluids. In practice, a number of injection and production wells will be used in a given field arranged in conventional patterns such as a line drive, a five spot or inverted five spot, or a seven spot or inverted seven spot.

In the use of the various flooding techniques, it has become a common expedient to add various polymeric thickening agents to the drive fluid to increase its viscosity to a point where it approaches that of the oil which is desired to be displaced, thus improving the displacement of oil from the formation. The polymers used for this purpose are often said to be used for "mobility" control.

Another problem encountered is that certain injected drive fluids may be much lighter than the reservoir fluids and thus separate by gravity, rising toward the top of the flowing region and resulting in the bypassing of the lower regions. This phenomena is known as gravity override.

Also encountered in the use of various flooding techniques is a situation caused by the fact that different regions or strata often have different permeabilities. When this situation is encountered, the drive fluid may preferentially enter regions of higher permeability due to their lower resistance to flow rather than the regions of low permeability where significant volumes of oil often reside.

It therefore is often desirable to plug the regions of high permeability, or "thief" zones, either partly or entirely, so as to divert the drive fluid into regions of lower permeability. The mechanical isolation of these thief zones has been tried but vertical communication among reservoir strata often renders this method ineffective. Physical plugging of the high permeability regions by cements and solid slurries has also been tried with varying degrees of success; however, these techniques have the drawback that still-productive sites may be permanently closed.

As a result of these earlier efforts, the desireability of designing a viscous slurry capable of sealing off the most permeable layers so that the drive fluid would be diverted to the underswept, "tighter" regions of the reservoir, became evident. This led to the use of oil/water emulsions, as well as gels and polymers for controlling the permeability of the formations. This process is frequently referred to as "profile" control, a reference to the control of the vertical permeability profile of the reservoir. Profile control agents which have been proposed include oil/water emulsions, gels, e.g., lignosulfate gels and polymeric gels, with polymeric gels being the most extensively applied in recent years.

There are a variety of materials commercially available for profile control, all of which perform differently and have their own, often unique, limitations. Among the many polymers examined thus far are polyacrylamides, polysaccharides, celluloses, furfural-alcohol and acrylic-epoxy resins, silicates and polyisocyanurates. A major part of the work conducted in this area has dealt with polyacrylamides. Polyacrylamides have been used both in their normal, non-crosslinked form as well as in the form of crosslinked metal complexes, as described, for example, in U.S. Pat. Nos. 4,009,755, 4,069,869 and 4,413,680. Shear degradation during injection and sensitivity to reservoir brines tend to diminish the beneficial effects derived from these polyacrylamides.

Proposals have been made for the use of inorganic polymers, especially inorganic silicates, as profile control agents. For example, U.S. Pat. Nos. 4,009,755 and 4,069,869 disclose the use of inorganic silicates for this purpose. In the profile control method described in these patents, an organic polymeric profile control agent such as a crosslinked polyacrylamide or polysaccharide is first injected into the reservoir, followed by an aqueous solution of an alkaline metal silicate and a material that reacts with the silicate to form a silicate gel which plugs the high permeability regions in the formation. An alkaline metal silicate is typically used as the source of silica and the gelling agent is usually an acid or acid-forming compound such as a water soluble ammonium salt, a lower aldehyde, an aluminum salt or an alkaline metal aluminate.

The problem, however, with many inorganic silicates is that their solutions are often quite viscous and stable only under alkaline conditions. As soon as conditions become acidic, a silicate gel is formed. Although this is the desired reaction for plugging the formation, it may occur prematurely. For example, gelation may begin before the solution has had an adequate opportunity to enter the high permeability regions of the formation, cutting off the possibilities for further injection of plugging material.

Other attempts have been made to achieve profile control. One such attempt is described in U.S. Pat. No. 4,498,539 to Bruning, which discloses delayed gelable compositions for injection of a water thickening amount of a polymer capable of gelling in the presence of a crosslinking agent so that after the composition has penetrated into an underground formation and positioned itself preferentially in the highly permeable strata, the delayed gelation is triggered by in-situ hydrolysis of an ester which reduces the pH of the composition to the gelable range thereby producing in-depth plugging of the strata with the gelled polymer.

A group of polymeric thickeners which has received considerable attention for use in waterflooding is xanthan polysaccharides. Xanthan polysaccharides are produced by the action of bacteria of the genus Xanthomonas on carbohydrates. For example, U.S. Pat. Nos. 3,757,863 and 3,383,307 disclose mobility control by the use of polysaccharides in the presence of polyvalent metal ion crosslinking agents. U.S. Pat. No. 3,810,882 discloses the possibility of using certain reducible complex metal ions as cross-linking agents for polysaccharides. U.S. Pat. Nos. 4,078,607 and 4,104,193 describe a method for improving the efficiency of waterflooding operations by a particular polysaccharide prehydration technique. U.S. Pat. No. 4,413,680 describes the use of crosslinked polysaccharides for selective permeability control in oil reservoirs.

U.S. Pat. No. 3,908,760 describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man-made fractures in formations. The use of polyvalent metal ions for crosslinking xanthan polysaccharides and other polymers which are to be used for permeability control is described in U.S. Pat. Nos. 4,009,755, 4,069,869 and 4,413,680. The use of phenol/aldehyde crosslinking agents with xanthan polysaccharides and other polymers is disclosed in U.S. Pat. Nos. 4,323,123 and 4,440,228.

Another type of polysaccharide which has been experimented with in the area of profile control is the non-xanthan, heteropolysaccharide S-130. S-130 belongs to the group of non-xanthan welan gums. S-130 is produced by fermentation with a microorganism of the genus Alcaligenes. Another welan gum heteropolysaccharide, known as S-194, is also produced by fermentation with a microorganism of the genus Alcaligenes. A notable characteristic of the heteropolysaccharide S-130 is that it develops a high viscosity in saline waters. This is particularly so in brines which contain divalent cations such as $Ca^{2+}$ and $Mg^{2+}$ or monovalent cations such as $Na^+$ and $K^+$.

U.S. Pat. No. 4,658,898 discloses the use of welan gum S-130 in saline waters. Crosslinking with trivalent cations, such as chromium, aluminum, zirconium and iron is also disclosed. Additionally, crosslinking with organic compounds containing at least two positively charged nitrogen atoms is disclosed in U.S. Pat. No. 4,658,898, which is hereby incorporated by reference in its entirety.

U.S. Pat. No. 4,787,451 filed Dec. 11, 1986, discloses the use of melamine-formaldehyde and other amino resins to crosslink various polymers including the welan gum heteropolysaccharide S-130. U.S. Pat. No. 4,787,451 is hereby incorporated by reference in its entirety.

A major problem which has attended the use of organic polymers as profile control agents is that of stability in the reservoir over time. Not only must the gel formed by the polymer be stable enough to withstand the relatively high temperatures encountered in some reservoirs—itself, a difficult requirement—but it must also be stable over a range of pH conditions so that it will have the potential of being used in different kinds of reservoirs, e.g. sandstone, carbonate rock and others. Stability to various oilfield brines is another highly desirable requirement. Many of the known organic gel-forming polymeric compositions are unsatisfactory in one respect or another, e.g., temperature stability, brine stability or pH range, so that there has been a continuing need, either for new polymers, or for ways to improve the stability characteristics of gels formed from known polymers.

A stability related phenomenon known to affect the gel-forming compositions having potential utility in enhanced oil recovery applications is that of syneresis. Syneresis is the contraction or shrinking of a gel so that liquid is exuded at the gel surface. For example, a gel said to exhibit 20% syneresis would take up 80% of its original volume, with the remaining 20% being expelled water. Although the exact mechanism responsible for the syneresis of such gel-forming compositions is not fully understood, it is believed to result from the over-crosslinking of the polymeric material that occurs with time. While it is not yet known what an acceptable level of syneresis might be for profile control gels, it is believed that to minimize syneresis would enhance the effectiveness of such gels.

Accordingly, it is an object of the present invention to provide aqueous crosslinked polymeric gel compositions having improved stability through reduced syneresis which are useful in enhanced oil recovery operations.

It is another object of this invention to provide a stable gel which exhibits substantially less syneresis when high temperatures are encountered.

It is a further object of this invention to provide for a substantially stable gel of reduced syneresis which is not adversely affected by the prevailing salinity or pH level.

It is yet another object to provide for an economical, stable gel for use as a profile control agent during enhanced oil recovery operations.

It is a yet further object of this invention to provide a method which is effective in reducing the syneresis of aqueous crosslinked polymeric gels useful in enhanced oil recovery operations.

It is still yet another object of this invention to provide for a process for selectively plugging regions of higher permeability within an oil-bearing subterranean formation to obtain improved sweep efficiency during a fluid flood oil recovery operation utilizing gels of improved stability.

Other objects, aspects and the several advantages of the invention will become apparent to those skilled in the art upon reading of the specification and the claims appended thereto.

SUMMARY OF THE INVENTION

According to the present invention, there is provided a aqueous crosslinked gel of improved stability comprising water, viscosifying amount of a water-dispersible polymer, a crosslinking agent and a stabilizing agent. The stabilizing agent is present in an amount effective to reduce syneresis as compared to a like gel without said stabilizing agent. These gels are useful in various fluid flooding oil recovery operations, including water, steam and carbon dioxide flooding, where improved sweep efficiency is desired. Also provided is a process for controlling the permeability of subterranean formations and a method for improving the stability of aqueous polymeric gels.

DESCRIPTION OF THE PREFERRED EMBODIMENTS

Any water-soluble or water-dispersible polymer capable of forming aqueous gels in the presence of a cross-linking agent can be used in the practice of this invention. Polymers of natural origin and biopolymers may be used. A preferred class of biopolymers which may be used include the polysaccharides produced by the action of bacteria of the genus Xanthomonas on a carbohydrate. The Xanthomonas polysaccharides, their method of preparation, their use in various applications in the petroleum industry are well known and are described, for example, in U.S. Pat. Nos. 3,243,000, 3,305,016, 3,208,518, 3,810,882 and 4,413,680, to which reference is made for disclosures of these materials, their preparation and their use. Other polymers of natural origin that may be used include cellulose polymers, e.g., the hydroxyalkyl celluloses and carboxyalkyl celluloses and their alkali metal and ammonium salts, as described in U.S. Pat. Nos. 4,009,755, 4,069,869 and 4,413,680, to which reference is made for a detailed description of these polymers.

A particular polysaccharide which is commercially available and is preferred for use in the present invention is the ionic polysaccharide B-1459 produced by fermentation of glucose with the bacterium *Xanthomonas campestris*.(NRPL B-1459, U.S. Department of Agriculture). This polysaccharide is produced by culturing the bacterium *Xanthomonas campestris* in a well aerated medium having a pH of about 7 which contains commercial glucose, organic nitrogen sources, dipotassium hydrogen phosphate and appropriate trace elements. This polymer is available from the Kelco Chemical Company under the trade name "Kelzan", from Pfizer under the trade name "Flocon" and from other commercial sources.

Another biopolymer which may be employed in the practice of the invention disclosed herein is the nonxanthan welan gum heteropolysaccharide biopolymer S-130 produced by fermentation under aerobic conditions of a bacterium of the Alcaligenes species, ATCC 31555. This polysaccharide is described in U.S. Pat. No. 4,342,866 to which reference is made for a description of it and of the method by which it may be produced. S-130 is commercially available from the Kelco Oil Field Group, a division of Merck and Co., Inc.

Any suitable polymer of acrylamide meeting the above-stated compatibility requirements can also be used in the practice of the invention. Thus, under proper conditions of use, such polymers can include various polyacrylamides and related polymers which are either water soluble or water dispersible and which can be used in an aqueous medium with the gelling agents described herein to give an aqueous gel. These can include the various substantially linear homopolymers and copolymers of acrylamide and methacrylamide. By substantially linear is meant that the polymers are substantially free of cross-linking between the polymer chains. The polymers can have up to about 50 percent of the carboxamide groups hydrolyzed to carboxyl groups. However, as the degree of hydrolysis increases, the polymers often become more difficult to disperse in brines, especially hard brines. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Examples of copolymers which can be used in the practice of the invention include the water-dispersible copolymers resulting from the polymerization of acrylamide or methacrylamide with an ethylenically unsaturated monomer. It is desirable that sufficient acrylamide or methacrylamide be present in the monomer mixture to impart to the resulting copolymer the above-described water-dispersible properties. Any suitable ratio of monomers meeting this condition can be used. Under proper conditions of use, examples of suitable ethylenically unsaturated monomers include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, vinyl-substituted cationic quaternary ammonium compounds, and the like. Various methods are known in the art for preparing said copolymers. For example, see U.S. Pat. Nos. 2,625,529, 2,740,522, 2,727,557, 2,831,841, and 2,909,508. These copolymers can be used in the hydrolyzed form, as discussed above for the homopolymers.

A preferred group of copolymers useful in the practice of the present invention are the copolymers of acrylamide or methacrylamide and a monomer such as the well known 2-acrylamido-2-methyl propanesulfonic acid AMPS ® monomer. (AMPS ® is a registered trademark of the Lubrizol Corporation of Cleveland, Ohio). Useful monomers, such as the AMPS ® monomer, and methods for their preparation are described in U.S. Pat. Nos. 3,507,707 and 3,768,565, the disclosure of which is incorporated by reference. The AMPS ® monomer is commercially available from the Lubrizol Corporation. The alkali metal salts, such as sodium 2-acrylamido-2-methylpropane sulfonate are also useful in the practice of this invention. These are also readily available.

Copolymers of acrylamide with said AMPS ® monomer, and/or its sodium salt, are known and useful in the practice of this invention. For an example of such a copolymer, see the above-mentioned U.S. Pat. No. 3,768,565. A number of these copolymers are available from Hercules Incorporated, Wilmington, Del.; for example, Hercules SPX-5024, a 90:10 acrylamide/AMPS ® sodium salt copolymer; Hercules SPX-5022, an 80:20 acrylamide/AMPS ® sodium salt copolymer; Hercules SPX-5023, a 50:50 acrylamide/AMPS ® sodium salt copolymer; and Hercules SPX-5025, a 30:70 acrylamide/AMPS ® sodium salt copolymer.

Another presently preferred group of copolymers for use in the practice of the invention are the copolymers of acrylamide or methacrylamide with a monomer such as those which are the subject of U.S. Pat. No. 3,573,263, the disclosure of which is incorporated by reference in its entirety. These useful monomers include the well known commercially available material (acryloyloxyethyl) diethylmethyl ammonium methyl sulfate, commonly referred to as DEMMS and the commercially available material (methacryloyloxyethyl) trimethylammonium methylsulfate also known as MTMMS.

Copolymers of acrylamide with said DEMMS monomer are commercially available, for example, an 80:20 acrylamide/DEMMS copolymer. Copolymers of acrylamide with said MTMMS monomer are also commercially available, for example, Hercules Reten® 210, a 90:10 acrylamide/MTMMS copolymer; and Hercules Peten® 220, an 80:20 acrylamide/MTMMS copolymer.

Other copolymeric materials which when used to form aqueous gels can benefit from the novel aspects of this invention are disclosed in U.S. Pat. No. 4,785,028, the contents of which are incorporated by reference in their entirety.

The polymers are generally used at concentrations ranging from 1,000 to 5,000 ppm in order to achieve the desired gel consistency; in most cases, however, concentrations of 1,000 to 3,000 ppm will be adequate and about 2,000 ppm is normally preferred, although reservoir conditions may require other concentrations.

Crosslinking agents useful in the practice of this invention include transitional metal ions, phenolic resins and amino resins. Suitable crosslinking agents include polyvalent metal cations such as $Al^{+3}$, $Cr^{+3}$, $Fe^{+3}$, $Sb^{+3}$ and $Zr^{+4}$. Also suitable for crosslinking are multifunctional amines such as diamines. For example, aluminum citrate can be admixed with the polymer or in slugs alternating with polymer slugs. Soluble compounds of $Cr^{+3}$ or $Fe^{+3}$ can be used, or oxidizable compounds of divalent iron such as $FeCl_2$ can be used in conjunction with an oxidant.

In the practice of this invention, a pre-formed phenolic resin can be used; said resin generally obtained by the condensation of phenol or substituted phenols with an aldehyde such as formaldehyde, acetaldehyde and furfural. Additionally, the phenol and aldehyde constituents can be added separately to produce the compositions of this invention, rather than being added as a pre-formed phenolic resin.

Any suitable water-dispersible phenol can be used in the practice of this invention. Phenolic compounds suitable for use in the present invention include phenol, resorcinol, catechol, 4,4'-diphenol, 1,3-dihydroxynaphthalene, pyrogallol, phloroglucinol and other similar compounds. Resorcinol and phenol are the preferred phenolics for most water and carbon dioxide drive applications, with resorcinal being particularly preferred. The choice of a phenol compound will be based largely on the rate of gelation desired. Mixtures of the named phenols may also be found to be useful.

A broad range of water-dispersible aldehydes are useful in the practice of the present invention. It is known that both aliphatic and aromatic monoaldehydes and dialdehydes can be used. The useful aliphatic monoaldehydes include those containing from one to ten carbon atoms per molecule, such as formaldehyde, paraformaldehyde, acetaldehyde, proprionaldehyde, butylaldehyde, isobutylaldehyde, heptaldehyde and others. Among the useful dialdehydes are glyoxyl, glutaraldehyde and terephthaidehyde. Mixtures of the various, aforementioned aldehydes are also useful in the practice of the present invention. Of the preferred aldehyde compounds, formaldehyde is particularly preferred.

Amino resins may either be preformed resins, such as the preferred melamine/formaldehyde resins, mixtures of amino compounds and aldehyde compounds or mixtures of preformed resins and aldehyde compounds. The aforementioned aldehyde compounds are also useful in the amino resin crosslinking agents of this invention. Particularly preferred amino resins are disclosed in U.S. Ser. No. 940,682, filed Dec. 11, 1986, which is incorporated by reference in its entirety.

Of the transitional metal ions useful in the practice of this invention, $Cr^{+3}$ ions are particularly preferred for forming gels. Chromic nitrate and chromic chloride have also been utilized to form gels. The pH may optionally be adjusted before crosslinking. Redox systems such as sodium dichromate and sodium bisulfite have been utilized to obtain $Cr^{+3}$ ions. Similar redox systems are described in U.S. Pat. No. 3,749,172, which is hereby incorporated by reference. When forming these gels, $Cr^{+3}$ ions are used in a preferred amount of from about 100–750 ppm. As is understood by those skilled in the art, the amount of $Cr^{+3}$ ions, or other transition metal ions, utilized will vary depending upon the molecular weight of the particular polymer utilized. In any event, the metal ions should be present in an amount sufficient to obtain the desired gelling effect.

Gels resultant from crosslinking of an acrylamide copolymer are formed in a preferred range between about pH 5 and pH 8 when forming with $Cr^{+3}$ and in a preferred range between about pH 3 and pH 10 with other crosslinking agents. These gels can be formed in fresh water, distilled water and synthetic sea water.

The amount of organic crosslinking agent useful in the practice of this invention will generally be a small but effective amount sufficient to initiate and cause gelation of an aqueous solution of the polymeric material. It will generally be found that the amount of amino or phenolic resin useful to form advantageous gels will be in the range of 0.02 to 5.0 weight percent. When preformed resin is not employed, the amount of the amino or phenol compound used will be in the range of 0.01 to about 2.0 weight percent, with concentrations of 0.05 to 1.0 weight percent generally preferred. The concentration of aldehyde used will be in the range of 0.01 to 3.0 weight percent, with concentrations of 0.1 to 1.0 weight percent generally preferred.

It has now been discovered that certain heterocyclic compounds, when used in the gel-forming compositions of this invention, produce significantly more stable gels, from the standpoint of gel syneresis, than a comparable like-gel without such a compound. The heterocyclic compounds which have now been found to have a beneficial influence on syneresis include imidazole, 1,2,4-triazole, 1,4-diaminobutane, 1-vinyl-2-pyrrolidinone, pyridine, pyrrole and piperazine. Of these, imidazole, a di-nitrogen ring compound is particularly preferred. While imidazole has been identified as a crosslinking agent for certain polymers useful in enhanced oil recovery in U.S. Pat. No. 4,613,631, the contents of which are incorporated by reference in their entirety, its use as a syneresis-reducing stability improver for aqueous polymeric gels was heretofore unknown. Additionally, although the aforementioned heterocyclic compounds are effective in reducing gel syneresis when used in the compositions disclosed herein, other similar heterocyclic compounds have been shown to produce no such benefit. For example, triethanolamine, tris(hydroxymethyl)-aminomethane, ethylenediaminetetraacetic acid (EDTA) and others have been tested and found to have no beneficial effect on gel stability.

The following data demonstrate the extent of the unexpected beneficial results obtained with the polymeric gels of the present invention. The invention is illustrated by the following non-limiting examples:

EXAMPLE 1

This example demonstrates the effect of imidazole on reducing polyacrylamide/phenol/formaldehyde gel syneresis. A solution of 2125 ppm unhydrolyzed polyacrylamide (obtained from Aldrich Chemical Company, Inc., of Milwaukee, Wis.), 1060 ppm phenol, 2000 ppm formaldehyde, and 1010 ppm imidazole was prepared in a brine of synthetic sea water. The pH was adjusted to 7.1 with 0.1N NaOH and 0.1N HCl. After standing at room temperature overnight, the solution was sealed in two ampoules and aged at 210° F. When next observed three days later, the samples formed stiff, light yellow gels with no syneresis. These samples remained unchanged after 4, 6 and 7 days. After 10 days the samples showed about 2% syneresis.

EXAMPLE 2

This example demonstrates that the gel system of Example 1 synereses readily without imidazole present. A sample was prepared like Example 1, except that no imidazole was included and the pH was adjusted to 6.8. This formed a firm gel similar to those of Example 1 after 3 days. After 4 days, the gel no longer adhered to the ampoule walls in that it slid within the ampoule when tipped. After 6 days, it showed 8% syneresis. After 7 and 10 days, the syneresis was 52 and 80%, respectively.

EXAMPLE 3

This example shows that triethanolamine, a buffer, does not stabilize the gel of Example 2. A gel was prepared as in Example 2 with the exception that 1030 ppm of triethanolamine was added and the pH was adjusted to 7.0. The gel so prepared aged in a subtantially similar manner as that of Example 2 in that it exhibited 50% syneresis after 7 days and 76% syneresis after 10 days.

EXAMPLE 4

This example shows that tris(hydroxymethyl)aminomethane (TRIS), also a buffer, does not stabilize the gel of Example 2. When a gel was prepared as in Example 2, with the exception that it included 1050 ppm of TRIS (pH 7.0), it aged nearly the same as the gel of Example 2 (47% syneresis after 7 days, 72% syneresis after 10 days).

EXAMPLE 5

This example demonstrates that ethylenediaminetetraacetic acid (EDTA), a divalent cation complexer, does not stabilize the gel of Example 2. When a gel was prepared as in Example 2 with the exception that it also included 1150 ppm of EDTA and had a pH adjusted to 7.0, it aged in a similar manner as the gel of Example 2 (52% syneresis after 7 days, 80% syneresis after 10 days).

EXAMPLE 6

This example demonstrates that 18-Crown-6, a cation complexer, does not stabilize the gel of Example 2. A gel was prepared as described in Example 2, except that it also included 1050 ppm of 18-Crown-6 and was adjusted to a pH of 6.7. The gel so prepared was observed to age similarly to the gel of Example 2 (52% syneresis after 7 days, 82% syneresis after 10 days).

EXAMPLE 7

This example shows that imidazole will stabilize a polyacrylamide/AMPS ® copolymer gel for many weeks. The syneresis results of samples prepared in 6% brine (90:10 NaCl:CaCl$_2$) containing 5000 ppm of the Phillips copolymer HE-E ®, 1000 ppm of phenol, 1050 ppm formaldehyde and imidazole in the amounts shown below (0-1600 ppm) and aged at 210° F. were:

TABLE 1

| Imidazole (ppm) | Syneresis (%) | |
|---|---|---|
| | 11 Weeks | 19 Weeks |
| 0 | 90 | 98 |
| 50 | 90 | |
| 100 | 80 | 96 |
| 200 | 60 | 94 |
| 400 | 3 | 10 |
| 800 | 1 | 4 |
| 1600 | 0 | 3 |

As shown, when imidazole is present at about 400 ppm or greater, nearly complete protection against syneresis is provided.

EXAMPLE 8

This example shows that imidazole can delay the syneresis of an intrinsically unstable polyacrylamide gel, but does not necessarily stop it. Gel samples A and B were formed using a polyacrylamide obtained from Aldrich Chemical Company, Inc., of Milwaukee, Wis., (unhydrolyzed, 5020 ppm), phenol (1020 and 1080 ppm, respectively), and formaldehyde (1850 and 1910 ppm, respectively) in synthetic sea water. Sample A contained imidazole (1080 ppm), while Sample B did not. The initial pH's were 7.8 and 7.1, respectively. The syneresis versus duration of storage at 210° F. was:

TABLE 2

| Days Aged | Syneresis (%) | |
|---|---|---|
| | A | B |
| 6 | 0 | 12 |
| 7 | 0 | 17 |
| 8 | 2 | 35 |
| 11 | 3 | 86 |
| 12 | 4 | 90 |
| 13 | 4 | 93 |
| 18 | 80 | 97 |

The pH value following the aging of Samples A and B were 6.6 and 5.7, respectively. The gel in Sample A split when syneresing to form sheets of gel. Sample B syneresed to form a tiny plug of gel.

EXAMPLE 9

This example demonstrates that imidazole will stabilize a xanthan gum-based biopolymer gel for an extended period of time. A solution of 3500 ppm of a xanthan gum biopolymer (Flocon ® 4800, obtained from Pfizer Inc., Chemicals Division, 235 E. 42nd St., New York, N.Y. 10017), 6000 ppm of a melamine-formaldehyde resin (Parez ® 613, obtained from American Cyanamid, Wayne, N.J.), 45 ppm chromium and 104 ppm NaOH was prepared in a brine of synthetic sea water. The solution so prepared was split into two like samples, to which 1000 ppm of imidazole was added to one sample. The two samples were stored and maintained at 175° F. and monitored for syneresis periodically. After 10 weeks of storage at 175° F., the gel sample containing imidazole exhibited only 5% syneresis. After 26 weeks of storage, the same gel sample exhibited only 8% syneresis. The xanthan gum-based gel sample without imidazole exhibited 43% syneresis after 26 weeks. The test was voluntarily discontinued after 26 weeks.

EXAMPLE 10

This example compares the performance of various heterocyclic compounds to imidazole in a polyacrylamide-based gel. A solution containing 5000 ppm of an unhydrolyzed polyacrylamide (obtained from Aldrich Chemical Co., Inc. of Milwaukee, Wis.), 1000 phenol and 1850 ppm formaldehyde was prepared in a brine of synthetic sea water. The solution was split to form ten samples and additized as shown in Table 3, below. The pH of each sample was adjusted to about 7 using solutions of 0.1N NaOH and 0.1N HCl. The samples were sealed in ampoules and aged at 210° F. Table 3 presents the results of subsequent observations.

TABLE 3
COMPARISON OF EFFECT OF VARIOUS HETEROCYCLIC COMPOUNDS ON GEL SYNERESIS FOR POLYACRYLAMIDE GELS

| EXAMPLE NUMBER | HETEROCYCLIC COMPOUND | GEL SYNERESIS, IN PERCENT, AT | | | |
|---|---|---|---|---|---|
| | | 1 WEEK | 1.5 WEEKS | 2 WEEKS | 3 WEEKS |
| 10-A | None | 15 | — | 92 | >75 |
| 10-B | Imidazole, 1000 ppm | 0 | — | 2 | >75 |
| 10-C | Piperazine, 1000 ppm | 5 | 27 | — | >75 |
| 10-D | 1,2,4-Triazole, 1000 ppm | 0 | — | 80 | >75 |
| 10-E | Pyrrole, 1000 ppm | 9 | — | 83 | >75 |
| 10-F | Pyridine, 1000 ppm | 6 | — | 85 | >75 |
| 10-G | 1H-Tetrazole, 1000 ppm | 26 | — | 90 | >75 |
| 10-H | 1-Vinyl-2-Pyrrolidinone, 1000 ppm | 0 | — | 86 | >75 |
| 10-I | 1,4-Diaminobutane, 1000 ppm | 0 | 80 | — | >75 |
| 10-J | Hydroquinone, 1000 ppm | 64 | 90 | — | >75 |

As indicated in Table 3, imidazole was found to be the most effective of the heterocyclic compounds. Although less effective, piperazine, 1,2,4-triazole, 1-vinyl-2-pyrrolidinone, pyridine, pyrrole and 1,4-diaminobutane were found to have short term syneresis-reducing properties. None of the other heterocyclic compounds used to form the compositions of Example 10 were found to have any syneresis-reducing benefits, whatsoever.

Although the mechanism for syneresis reduction is not fully understood, the above examples suggest that such stabilization is not brought about through buffering or calcium complexing. It is speculated that, perhaps, these gels are stabilized by having covalently bonded "soft" cations attached to them.

Where it is desired to obtain increased sweep efficiency, gels of this invention can be used to plug a previously swept portion of a formation. These gels can be directed to areas of increased porosity by utilizing any suitable method known to those skilled in the art. The permeability control treatment may be carried out periodically, when necessary, to achieve the desired permeability profile.

One method where gels of this invention can be utilized is during a waterflooding process for the recovery of oil from a subterranean formation. After plugging the more permeable zones of a reservoir with the novel gels of this invention, a waterflooding process can be commenced or resumed. U.S. Pat. No. 4,479,894, issued to Chen et al., describes one such waterflooding process. This patent is hereby incorporated by reference in its entirety.

Steamflood processes which can be utilized when employing the gels described herein are detailed in U.S. Pat. Nos. 4,489,783 and 3,918,521 issued to Shu and Snavely, respectively. These patents are hereby incorporated by reference herein.

Gels described herein can also be used in conjunction with a carbon dioxide flooding process, either alone, or in conjunction with a cyclical steam stimulation in a heavy oil recovery process to obtain greater sweep efficiency. Cyclic carbon dioxide steam stimulation can be commenced or resumed after plugging the more permeable zones of the reservoir with the novel gels of this invention. A suitable process is described in U.S. Pat. No. 4,565,249 which issued to Pebdani et al. This patent is hereby incorporated by reference in its entirety. Increased sweep efficiency can be obtained when the subject gels are used in combination with a carbon dioxide process for recovering oil. Prior to commencement or resumption of the carbon dioxide process, the more permeable zones are plugged with these novel gels.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. An aqueous crosslinked polymeric gel composition comprising:
   (a) water;
   (b) a viscosifying amount of a water-dispersible polymer selected from the group consisting of polyacrylamides, polysaccharides, heteropolysaccharides, cellulose ethers and mixtures thereof;
   (c) a crosslinking agent in an amount effective to cause gelation of the aqueous solution of said water-dispersible polymer, said crosslinking agent selected from the group consisting of transition metal ions, phenolic resins, mixtures of a phenolic compound and an aldehyde, amino resins and mixtures thereof; and
   (d) a heterocyclic stabilizing agent in an amount effective to reduce syneresis of the gel composition.

2. The composition of claim 1, wherein said heterocyclic compound is selected from the group consisting of imidazole, piperazine, 1,2,4-triazole, 1-vinyl-2-pyrrolidinone, pyridine, pyrrole and 1,4-diaminobutane.

3. The composition of claim 2, wherein said mixture of a phenolic compound and an aldehyde comprises about 1 to 99 weight percent of at least one phenolic compound selected from the group consisting of phenol, resorcinol, catechol, phloroglucinol, pyrogallol, 4,4'-diphenol and 1,3-dihydroxynaphthaline; and about 1 to about 99 weight percent of at least one aldehyde component selected from the group consisting of aliphatic monoaldehydes, aromatic monoaldehydes, aliphatic dialdehydes and aromatic dialdehydes.

4. The composition of claim 3, wherein said phenolic compound is phenol and said aldehyde component is formaldehyde.

5. The composition of claim 2, wherein said amino resin is a condensate of formaldehyde and melamine.

6. The composition of claims 2, 4, or 5, wherein imidazole is present in an amount greater than about 200 ppm by weight.

7. The composition of claim 6, wherein said imidazole is present in an amount of at least about 400 ppm by weight.

8. A method for improving the stability of an aqueous gel-forming polymeric composition which comprises introducing to said composition a heterocyclic stabilizing agent in an amount effective to reduce syneresis of said composition when in gel form.

9. The method of claim 8, wherein said heterocyclic compound is selected from the group consisting of imidazole, piperazine, 1,2,4-triazole, 1-vinyl-2-pyrrolidinone, pyridine, pyrrole and 1,4-diaminobutane.

10. The method of claim 9, wherein said imidazole is introduced in an amount greater than about 200 ppm by weight.

11. The method of claim 10, wherein said imidazole is introduced in an amount of at least about 400 ppm by weight.

* * * * *